United States Patent [19]

Schiller et al.

[11] 4,181,607

[45] Jan. 1, 1980

[54] REMOVAL OF ASBESTOS FIBERS FROM WATER

[75] Inventors: Joseph E. Schiller; Sanaa E. Khalafalla, both of Minneapolis, Minn.

[73] Assignee: The United States of America as represented by the Secretary of the Interior, Washington, D.C.

[21] Appl. No.: 942,846

[22] Filed: Sep. 15, 1978

[51] Int. Cl.$^2$ ...................... B01D 15/00; B01D 37/00
[52] U.S. Cl. ...................................... 210/36; 210/65; 423/167; 423/331
[58] Field of Search ...................... 55/74; 162/3, 153; 210/24, 36, 41, 65; 423/167, 331

[56] References Cited

U.S. PATENT DOCUMENTS

| 2,593,125 | 4/1952 | Eaton et al. | 423/331 X |
| 3,184,288 | 5/1965 | de Lisle | 162/3 |
| 3,421,975 | 1/1969 | Woolery et al. | 162/3 |
| 3,887,462 | 6/1975 | Lagess et al. | 210/53 |

Primary Examiner—Charles N. Hart
Assistant Examiner—Richard W. Burks
Attorney, Agent, or Firm—William S. Brown; Donald A. Gardiner

[57] ABSTRACT

Asbestos fibers are removed from water by filtration through a bed of magnesium oxide.

3 Claims, No Drawings

REMOVAL OF ASBESTOS FIBERS FROM WATER

Removal of asbestos from aqueous media, such as drinking water, process effluents, etc., has assumed importance because of potential hazards of such contaminants. Various solid materials, such as lime, limestone and dolomite, have been employed for removal of contaminants such as fluoride and silica from water, generally by means of processes involving chemical reactions with the contaminants. However, a simple and efficient means for removal of asbestos fibers from water is still needed.

It has now been found, according to the process of the invention, that efficient removal of asbestos fibers from aqueous media may be accomplished by filtration of the aqueous media through a bed of magnesium oxide.

Any conventional process providing adequate contact between the aqueous feed and the magnesium oxide filtration medium may be used in the process of the invention. Generally, the most convenient and efficient method consists of percolation of the feed through a bed of the magnesium oxide in a tube or column of suitable dimensions. Optimum amount and particle size of the magnesium oxide, as well as dimensions of the column, will obviously vary with the specific nature of the feed, amount and type of asbestos in the feed, flow rate of the feed through the column, etc, and are best determined empirically. However, a magnesium oxide particle size of about 100 to 200 mesh, and a bed depth of about 0.5 to 1 cm, with a feed flow rate of about 100 to 200 ml/hr. per $cm^2$ of bed will generally give good results.

Amphibole asbestos fibers are negatively charged when dispersed in water at pH values above about 4, while magnesium oxide is positively charged below a pH of 12. Consequently, the pH of the feed solution should be maintained approximately within the range of 4 to 12 to ensure maximum attraction of the amphibole fibers. Chrysotile asbestos fibers, despite being positively charged in water, are also efficiently adsorbed by the magnesium oxide, probably due to a crystal lattice energy involved in their attachment that overcomes the electrical repulsion. In any event, the magnesium oxide filtration medium of the invention has been found to be very efficient in removal of both amphibole and chrysotile asbestos fibers, as well as other asbestos fibers such as crocidolite, grunerite and cummingtonite, from aqueous feeds.

The process of the invention will be more specifically illustrated by the following examples.

EXAMPLE 1

A series of tests were conducted in which suspensions of Amosite fibers ranging from about 1 to 10 ppm in water were percolated through a layer of magnesium oxide with gravity feed providing linear flow rates ranging from $1.5 \times 10^{-4}$ to $5 \times 10^{-4}$ m/sec. Amosite is the trade name for a commercial materal consisting of amphibole cummingtonite-grunerite asbestos.

The magnesium oxide layer was formed by placing a cotton or glass wool plug in the bottom of a glass tube to support a layer of pulverized magnesium oxide of a mesh size ranging from about 60/100 to 325/400. Depth of the magnesium oxide layer in the tube ranged from 0.5 to 1.5 cm.

After passing through the magnesium oxide layer, the solutions were examined for fibers using a scanning electron microscope. No fibers were found in any of the magnesium oxide-treated water, but they were abundant in both the unfiltered suspensions and in water that was filtered through a layer of cotton only, thus illustrating the efficiency of the process of the invention for removal of asbestos fibers from water.

EXAMPLE 2

In this example, suspensions of chrysotile fibers were prepared and treated by procedures essentially the same as those of Example 1. Again, no fibers were found in the magnesium oxide-treated water.

EXAMPLE 3

Crocidolite asbestos (0.5 mg) was dispersed in 500 ml of water. A 200 ml portion was passed through about 2 grams of 100/200 mesh magnesium oxide supported by a cotton plug in an 11 mm o.d. glass tube. Another 200 ml of the crocidolite dispersion was similarly percolated, except that the cotton plug did not contain magnesium oxide and acted as the control (untreated) sample. About 1 hour was required for the treatment. Equal volumes (100 ml) of the magnesium oxide untreated and treated suspensions were separately passed through $0.45\mu$ Milipore filters to collect the suspended fibers. Photographs of the filters, of a magnification of X3000, showed the asbestos fibers present on the Milipore filter used for the untreated water, with a complete absence of fibers on the filter used for the treated water.

We claim:

1. A method for removal of asbestos fibers from water, the concentration of the fibers in the water being about 1 to 10 parts per million, comprising filtering, the water through a layer of magnesium oxide whereby the asbestos fibers are removed from the water.

2. The method of claim 1 in which the filtration is accomplished by percolation of the water through a bed of the magnesium oxide in a column.

3. The method of claim 1 in which the particle size of the magnesium oxide is in the range of about 60 to 400 mesh.